Dec. 9, 1930.  A. H. OLSSON ET AL  1,783,974
ALARM APPARATUS FOR THE PREVENTION OF GAS POISONING
Filed June 20, 1928
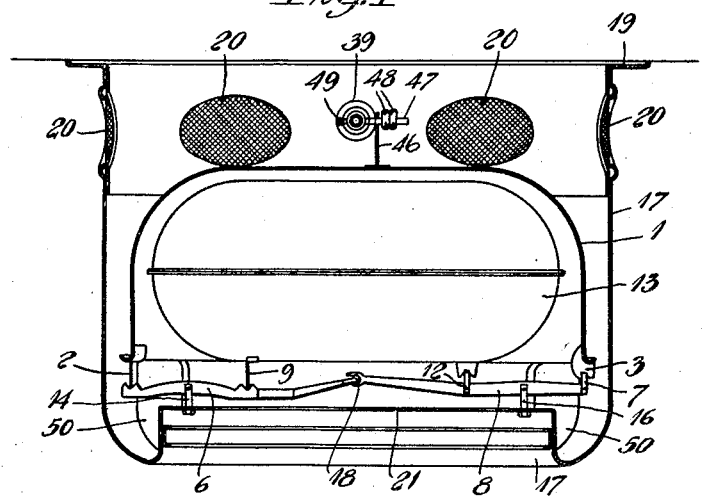
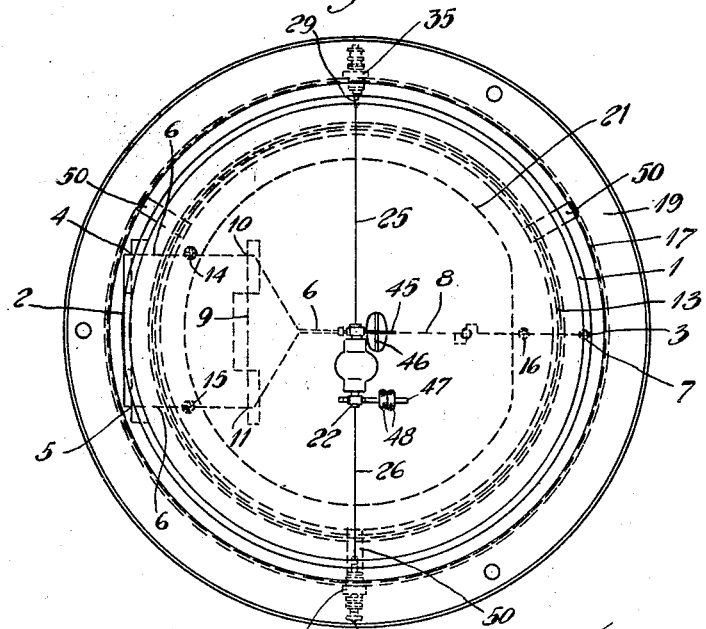
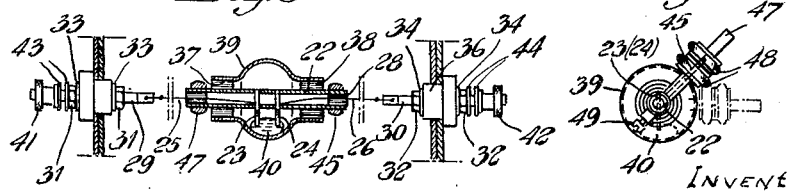
INVENTORS.
ANDERS HILMER OLSSON AND PER DANIEL PETERSON
Attorney.

Patented Dec. 9, 1930

1,783,974

UNITED STATES PATENT OFFICE

ANDERS HILMER OLSSON AND PER DANIEL PETERSON, OF LIDKOPING, SWEDEN

ALARM APPARATUS FOR THE PREVENTION OF GAS POISONING

Application filed June 20, 1928, Serial No. 286,950, and in Sweden June 11, 1927.

The ever increasing use of gaseous hydrocarbons and other combustible gases adapted for illuminating and heating purposes entails, as is proved by everyday experience, great dangers to the health and life of men. By reason of leakage in pipe conduits or hoses, or on account of carelessness in the attendance of cocks and the like, it may easily occur that the poisonous gases escape in dwelling houses or other localities where men are living, the said gases being then apt to bring about serious disasters by inhalation or by explosions.

The said gases or gas mixtures, such as illuminating gas, water gas, acetylene, hydrogen and so forth, all have the property in common that they are lighter than air or, in other words, have a smaller specific weight than the latter.

The present invention has for its object to afford protection against gas poisoning and gas explosions, and is principally characterized by the fact that a float and a gas bell connected with or adapted to actuate one or more balance arms or other mechanical members, cooperate to alter a state of equilibrium when gas is escaping or is present in the locality where the alarm apparatus is situated, the circuit of an electric signal bell being then closed. The alarm thus produced is sufficient to call the attention of persons in the neighbourhood to the greater or smaller deficiencies of the gas plant, whereupon steps may be taken to obviate the faults.

The accompanying drawing illustrates a suitable embodiment of the invention. Fig. 1 is an elevation showing the outer part or cap as well as the gas bell and some other details in section. Fig. 2 is a horizontal view, while Figs. 3 and 4 are a section and an endwise view respectively of the switch and the connecting terminals of the electric circuit on an enlarged scale.

A gas bell 1, which is entirely open at the bottom, is provided at its outer edges with two supports 2 and 3 rigidly secured thereto. The support 2 is placed at the points 4 and 5 on a double balance arm 6, and the support 3 is arranged on the link 7, which is movably connected at its lower end to a single balance arm 8 opposite to the arm 6. In a similar manner, a gas-tight float 13 is provided within the bell 1 and placed by means of the support 9 at the points 10 and 11 on the balance arm 6, and by means of the link 12 on the balance arm 8. The bolts 14, 15 and 16 are fixedly connected with the cap or frame 17 of the apparatus, and are formed at the top into bearing members for the balance arms 6 and 8 respectively. Furthermore, the said balance arms are movably connected with one another at the point 18, so that the same will always take part in any oscillatory movements at the same time. Moreover, the bearing points for the gas bell and the float are so adapted that the moments of these parts with respect to the oscillatory center of the balance arms are equal or approximately so. Provided at the top on the cap 17 is a flange 19 specially shaped for mounting the apparatus in a suitable manner, the said flange and the cap having a series of openings 20 provided therein to facilitate connection between the part of the cap above the gas bell and the surrounding atmosphere. Access is provided for the injurious gases to the interior of the apparatus through a larger opening 21 at the lower part of the cap. To prevent dust and the like from penetrating to the operative members of the apparatus, all openings of the cap are covered by a suitable fabric admitting gaseous fluids therethrough. The switch for the electric signal wiring is mounted above the gas bell. The switch arrangement comprises an ebonite tube 22, at the middle point of which two metal pins 23 and 24 are inserted at some distance from each other. Secured to each of these pins are fine metal wires 25 and 26 extended through the plugs 27 and 28 of the tube 22, which plugs consist of rubber or a similar substance, the wires 25 and 26 being finally connected with the contact and tension screws 29 and 30. By means of the said screws with the appertaining nuts and washers 31, 32, 33 and 34, which are attached in and insulated from the material of the cap 17 and the flange 19 by the ebonite buttons 35 and 36, the said wires 25 and 26 may be tightened and secured in place, so that the same and the axis of the ebonite tube form a straight or nearly straight line between the cylindrical walls of the apparatus. Furthermore, a glass pipe 39 is arranged on the ebonite tube by means of the rubber packings 37 and 38, said glass pipe 39 being somewhat enlarged at the center and containing a small volume of mercury 40. The screws 41 and 42 and the washers 43 and 44 form connecting members for the part of the circuit provided outside the apparatus, which circuit includes an electric signal bell constructed in known manner and mounted in any suitable place. At the other end of the tube there is further mounted a small lever 45 which is movably connected with and cooperates with an arm 46 on the gas bell, and at the opposite end of the same tube there is provided a counterweight consisting of the lever 47 and two adjusting nuts 48. The counterweight is not only adjustable with respect to the magnitude of the moment, but is also movable by means of the locking screw 49 into different angular positions relatively to the lever 45, whereby, consequently, the moment caused thereby on the movable system may also be altered in regard to the turning direction. When the apparatus is surrounded by air, the counterweight should be normally adjusted so that the gas bell is bearing lightly on three abutments 50 inserted in the cap at the bottom thereof.

With the adjustment of the gas bell 1, the float 13 and the balance arms 6 and 8 or the main parts of the movable system as disclosed in the drawing, the gas bell bears on the abutments 50. The apparatus is then surrounded by air. If the outer circuit of the signal bell is connected to the contact screws 29 and 30, an alarm cannot be given, however, inasmuch as the circuit is open between the metal pins 23 and 24, which are so adjusted that their lower end points will, with this adjustment of the system of the apparatus, be situated immediately above the mercury 40. However, if illuminating gas or some other previously mentioned gas mixture is to be found in the surroundings of the apparatus, a portion of the gas will be collected in the bell 1 and exert a raising effect on the same. At the same time the float 13 will be surrounded by a lighter medium so that the float will sink or move in a downward direction. The movements of the gas bell and those of the float are brought into cooperation by the balance arms 6 and 8, besides which the lever 45 actuates the tube 22 so that the wires 25 and 26 are slightly twisted. The metal pins 23 and 24 are thus brought into contact with the mercury 40, whereby the circuit of the signal bell is closed and the desired alarm is given.

The material as well as the shape of the float permit of automatic adjustment of the enclosed volume of air according to the pressure and temperature variations of the outer or surrounding air. Under normal conditions the apparatus, therefore, can never give a signal on account of the last-mentioned alterations in the atmospheric conditions.

Hereinbefore, only one of the uses of the alarm apparatus has been mentioned, i. e. its use for showing the presence in air of gases or gas mixtures having a smaller specific weight than air. By somewhat modifying the apparatus the same may be employed to indicate the presence of a heavier gaseous fluid in air or, generally, to prove any alterations caused in the density of the gaseous fluid by reason of the same being mixed with other gases, either heavier or lighter than said first-mentioned fluid.

What we claim as new and desire to secure by Letters Patent of the United States of America is:—

1. In alarm apparatus for the prevention of gas poisoning or gas explosions on the escapement of poisonous or combustible gases into dwelling rooms or other localities, the combination of a float, a gas bell, an electrical switching device, and mechanical means for transmitting the combined action of said float and said gas bell to said switching device, so that upon an alteration of the state of equilibrium under the influence of a gas having a density other than the gaseous medium normally surrounding the float and the gas bell the said switching device will close an electric circuit containing a signal bell.

2. In alarm apparatus for the prevention of gas poisoning or gas explosions on the escapement of poisonous or combustible gases into dwelling rooms or other localities, the combination of a float, a gas bell, an electrical switching device, and mechanical means for transmitting the combined action of said float and said gas bell to said switching device, so that, upon an alteration of the state of equilibrium under the influence of a gas having a density other than the gaseous medium normally surrounding the float and the gas bell, the said switching device will close an electric circuit containing a signal bell, said electrical switching device comprising a mercury switch adapted to close and break said circuit under the influence of a turning moment.

3. In alarm apparatus for the prevention of gas poisoning or gas explosions on the escapement of poisonous or combustible gases into dwelling rooms or other localities, the combination of a float, a gas bell, an electrical switching device, and mechanical means for transmitting the combined action of said float and said gas bell to said switching device, so that upon an alteration of the state of equilibrium under the influence of a gas having a density other than the gaseous medium normally surrounding the float and the gas bell the said switching device will close an electric circuit containing a signal bell, said float, gas bell, switching device and transmitting means being enclosed and carried by a cap having mounting members at the top and an opening covered by fabric at the bottom.

4. In alarm apparatus for the prevention of gas poisoning or gas explosions on the escapement of poisonous or combustible gases into dwelling rooms or other localities, the combination of a float, a gas bell enclosing said float, an electrical switching device, and mechanical means for transmitting the combined action of said float and said gas bell to said switching device, so that upon an alteration of the state of equilibrium under the influence of a gas having a density other than the gaseous medium normally surrounding the float and the gas bell, the said switching device will close an electric circuit containing a signal bell.

In testimony whereof we affix our signatures.

ANDERS HILMER OLSSON.
PER DANIEL PETERSON.